(12) United States Patent
Kang et al.

(10) Patent No.: US 8,632,919 B2
(45) Date of Patent: Jan. 21, 2014

(54) ELECTROLYTE OF HIGH TEMPERATURE PROPERTY AND OVERCHARGE-PREVENTION PROPERTY AND SECONDARY BATTERY EMPLOYED WITH THE SAME

(75) Inventors: Eun Ju Kang, Hwaseong-si (KR); Kyoung-won Kang, Daejeon (KR); Hyang Mok Lee, Daejeon (KR); Jung Kyu Woo, Daegu (KR)

(73) Assignee: LG Chem, Ltd., Seoul (KR)

( * ) Notice: Subject to any disclaimer, the term of this patent is extended or adjusted under 35 U.S.C. 154(b) by 538 days.

(21) Appl. No.: 12/445,601

(22) PCT Filed: Sep. 21, 2007

(86) PCT No.: PCT/KR2007/004624
§ 371 (c)(1),
(2), (4) Date: Aug. 30, 2010

(87) PCT Pub. No.: WO2008/048006
PCT Pub. Date: Apr. 24, 2008

(65) Prior Publication Data
US 2010/0310944 A1    Dec. 9, 2010

(30) Foreign Application Priority Data

Oct. 16, 2006  (KR) .................. 10-2006-0100094

(51) Int. Cl.
*H01M 6/16* (2006.01)
(52) U.S. Cl.
USPC ............ 429/338; 429/336; 429/325; 429/324

(58) Field of Classification Search
USPC ......... 429/324, 325, 326, 327, 330, 331, 332, 429/336, 338, 188
See application file for complete search history.

(56) References Cited

U.S. PATENT DOCUMENTS

| 8,163,427 B2 * | 4/2012 | Abe et al. ...................... 429/330 |
| 2003/0118912 A1 | 6/2003 | Watanabe et al. |
| 2007/0048607 A1 | 3/2007 | Nakashima et al. |

FOREIGN PATENT DOCUMENTS

| JP | 2002-313415 A | 10/2002 | |
| JP | 2003-257479 A | 9/2003 | |
| JP | 2003-308875 A | 10/2003 | |
| JP | 2004-134261 A | 4/2004 | |
| JP | 2004-247187 A | 9/2004 | |
| JP | 2005-259680 A | 9/2005 | |
| KR | 2003-0051609 A | 6/2003 | |
| KR | 10-2003-0061219 A | 7/2003 | |
| KR | 2003-0061218 A | 7/2003 | |
| KR | 10-0804689 B1 | 2/2008 | |
| WO | WO 2005/008829 | * 1/2005 | ............ H01M 10/40 |
| WO | WO 2005/076403 A1 | 8/2005 | |

* cited by examiner

*Primary Examiner* — Raymond Alejandro
(74) *Attorney, Agent, or Firm* — Birch, Stewart, Kolasch & Birch, LLP

(57) ABSTRACT

Provided is a secondary battery electrolyte having improved high temperature properties and overcharge-prevention properties, particularly improved overcharge-prevention properties under high voltage/high current conditions, in conjunction with a minimized deterioration of the battery performance, by adding 3 to 5% by weight of cyclohexyl benzene (CHB) and 0.2 to 1.5% by weight of 2-fluoro biphenyl (2-FBP) as overcharge-preventing additives to an electrolyte of a lithium secondary battery.

3 Claims, 6 Drawing Sheets

ELECTROLYTE OF HIGH TEMPERATURE PROPERTY AND OVERCHARGE-PREVENTION PROPERTY AND SECONDARY BATTERY EMPLOYED WITH THE SAME

FIELD OF THE INVENTION

The present invention relates to a secondary battery electrolyte having improved high temperature properties and overcharge-prevention properties. More specifically, the present invention relates to a secondary battery electrolyte having improved high temperature properties and particularly improved overcharge-prevention properties under high voltage/high current conditions, in conjunction with a minimized deterioration of battery performance, by adding 3 to 5% by weight of cyclohexyl benzene (CHB) and 0.2 to 1.5% by weight of 2-fluoro biphenyl (2-FBP) to an electrolyte.

BACKGROUND OF THE INVENTION

In recent years, rechargeable secondary batteries have been widely used as an energy source for wireless mobile equipment. Among other things, there has been an increasing demand for lithium secondary batteries due to various advantages such as a high-energy density, a high-discharge voltage and a superior power output stability.

Generally, the lithium secondary battery uses a metal oxide such as $LiCoO_2$ as a cathode active material and a carbon material as an anode active material, and is fabricated by disposition of a porous polyolefin separator between the anode and the cathode and impregnation of the resulting electrode assembly with a non-aqueous electrolyte containing a lithium salt such as $LiPF_6$. Upon charging, lithium ions deintercalate from the cathode active material and intercalate into a carbon layer of the anode. In contrast, upon discharging, lithium ions deintercalate from the carbon layer of the anode and intercalate into the cathode active material. Here, the non-aqueous electrolyte serves as a medium through which lithium ions migrate between the anode and the cathode. Such a lithium secondary battery must be basically stable in an operating voltage range of the battery and must have an ability to transfer ions at a sufficiently rapid rate.

Safety evaluation and safety securing are very important in the lithium secondary battery, and there is an urgent need for a battery with a secured safety against fire and explosion.

Meanwhile, the lithium secondary battery has advantages such as high energy density and high discharge voltage, as described above, but suffers from problems such as the risk of a momentary flow of high energy due to a high operating potential of the battery, and battery explosion or fire which may occur due to the formation of dendrites of a lithium metal on an anode surface, upon overcharge of the battery.

One of the most dangerous situations which may occur upon overcharge of a battery is "high-temperature overcharge". When the lithium ion battery is overcharged to a level of 4.2 V or higher, the electrolyte begins to be decomposed, and a higher charge temperature leads to a higher probability of ignition because the battery temperature increases to easily reach an ignition point. However, ignition is difficult to occur in the closed space of a battery as oxygen is not supplied thereto. $LiCoO_2$ which is used as a cathode active material in the battery has a crystal structure of "O—Co—O—Li—O—Co—O" where Li is interposed between the layered structures of "O—Co—O" in which a Co layer is positioned between oxygen atom layers. Such a crystal structure is not stable. Therefore, at a high temperature, $LiCoO_2$ has a great tendency to be converted into a stable spinel structure. This spinel has a molecular formula of $LiCo_2O_4$, and thus has a small amount of oxygen per unit cell, as compared to the layered structure. Therefore, extra oxygen atoms dissociate from the crystal structure and migrate to the electrolyte. As a result, this leads to a supply of oxygen to the electrolyte which reached the ignition point, thereby causing explosion of the battery due to ignition.

As an approach to prevent explosion of the battery which may occur under the above-mentioned high temperature conditions or overcharged state, there has been proposed a method of mounting a protection circuit on a battery or a method of using thermal choking by a separator. However, utilization of the protection circuit requires an additional installation space inside the battery, which consequently limits its miniaturization and low-cost production of a battery pack. Further, a thermal choking mechanism using the separator may not effectively work upon rapid heat generation, so it is difficult to achieve reliable operation properties.

As a scheme to solve the above-mentioned problems, there has been recently proposed use of an organic electrolyte additive. For example, Japanese Unexamined Patent Publication No. 2004-247187 and Korean Patent Application Publication No. 2003-61219 A1 disclose a technique of inhibiting an overcharge reaction, wherein addition of cyclohexyl benzene (CHB) to an electrolyte leads to a progress of an exothermic oxidation reaction under an abnormal high voltage, arising from the overcharge of the battery, and the resulting heat elevates an internal temperature of the battery within a short period of time to thereby block pores of a separator. However, due to a relatively high decomposition voltage of CHB upon addition of CHB alone, decomposition of CHB is difficult to occur when the battery is overcharged under a low voltage. Further, when the battery is left at high temperatures, oxidative decomposition of CHB leads to problems associated with the evolution of a large amount of gas and consequently swelling of the battery, thus resulting in deterioration of the battery performance.

In order to keep pace with the continuing trend towards higher functionalization and diversification of functions of a variety of electronic devices to which a secondary battery is applied, there is also an increasing need for batteries which are capable of operating under high voltage/high current conditions. However, the aforementioned electrolyte additive usually suffers from a problem associated with the poor overcharge safety under high voltage/high current conditions.

For these reasons, there is an urgent need for development of a more effective technique which is capable of securing the battery safety under high temperature conditions and upon overcharge of the battery while not causing deterioration of the battery performance, and is particularly capable of securing the battery safety even under high voltage/high current conditions.

In this connection, the present invention proposes a scheme which is capable of obtaining unexpected significant overcharge-prevention properties, particularly overcharge-prevention properties even under high voltage/high current conditions, by adding a given content of a specific combination of 2-fluoro biphenyl (2-FBP) and cyclohexyl benzene (CHB) to an electrolyte.

Even though some conventional arts suggest the use of the additive such as 2-FBP, CHB, or the like, as an electrolyte additive for the secondary battery, there is no case demonstrating the fact that use of the specific combination of 2-FBP and CHB, as will be illustrated in the present invention, can bring about unexpected significant effects on overcharge-prevention properties.

For example, Japanese Unexamined Patent Publication No. 2003-257479 discloses a non-aqueous electrolytic solution for a lithium secondary battery, comprising a fluorine-substituted aromatic compound and an aromatic hydrocarbon compound, wherein the non-aqueous electrolytic solution contains 0.1 to 20% by weight of the fluorine-substituted aromatic compound and 0.4 to 3% by weight of the aromatic hydrocarbon compound.

Japanese Unexamined Patent Publication No. 2004-134261 discloses a non-aqueous electrolyte comprising Component A and Component B as sub-solvents, wherein Component A is at least one selected from the group consisting of cyclohexyl benzene, biphenyl and diphenyl ether, and Component B is a compound having an oxidation potential higher than that of Component A, wherein the sub-solvent is added in an amount of 0.01 to 5% by weight based on the total weight of the electrolyte and the ratio of Component B in the sub-solvent is 20 to 99% by weight.

Further, Japanese Unexamined Patent Publication No. 2003-308875 discloses a nonaqueous secondary battery electrolyte comprising at least one selected from a sultone compound, cyclic sulfate and vinylene carbonate and at least one selected from a cycloalkyl benzene derivative (such as CHB) and a biphenyl derivative (such as 2-FBP).

However, the aforementioned conventional arts merely exemplify various kinds of materials that may be added to the electrolyte, and do not suggest that a specific combination of such additive compounds and a content range thereof in accordance with the present invention, as will be illustrated hereinafter, will bring about significant synergistic overcharge-prevention effects. Such a discovery in accordance with the present invention is also apparent from the fact that working examples of the aforesaid patent applications exemplify no use of such a combination.

Meanwhile, Japanese Unexamined Patent Publication No. 2002-313415 discloses a non-aqueous electrolyte comprising biphenyl and cyclohexyl benzene (CHB) as additives, wherein amounts of biphenyl and cyclohexyl benzene added to the non-aqueous electrolyte are 0.5 to 1.5% by weight and 0.5 to 2.0% by weight, respectively. However, according to the experiments performed by the present inventors, it was confirmed that the aforesaid art suffers from a significant increase in an oxidation current value and a low value in exothermic energy, so sufficient high temperature properties and overcharge-prevention properties are not achieved. In this connection, Experimental Examples, which will be illustrated hereinafter, provide analysis experimental results of overcharge characteristics and battery properties for an additive made of a combination of 2-FBP and CHB in accordance with the present invention and an additive made of a combination of biphenyl and CHB in accordance with the aforesaid conventional art.

SUMMARY OF THE INVENTION

Therefore, the present invention has been made to solve the above problems and other technical problems that have yet to be resolved.

Specifically, it is an object of the present invention to provide a secondary battery electrolyte which is capable of effectively exerting high temperature properties and overcharge-prevention properties, particularly overcharge-prevention properties under high voltage/high current conditions, without degradation of battery performance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
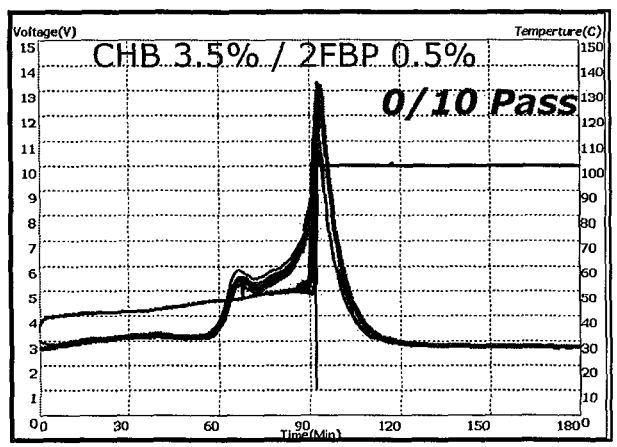
FIG. 1 is a graph showing overcharge profiles of batteries of Example 1.

In accordance with an aspect of the present invention, the above and other objects can be accomplished by the provision of a secondary battery electrolyte comprising cyclohexyl benzene (CHB) and 2-fluoro biphenyl (2-FBP), wherein 3 to 5% by weight of CHB and 0.2 to 1.5% by weight of 2-FBP are added to the electrolyte.

When an overvoltage is applied to the battery due to overcharge, CHB, used as an electrolyte additive, undergoes electrochemical polymerization, which results in increased internal resistance of the battery, thereby increasing a stability of the battery. That is, the exothermic oxidation reaction progresses under overvoltage conditions and then CHB polymerizes to form a film on the cathode surface to thereby inhibit migration of lithium ions, which results in increased internal resistance of the battery in conjunction with generation of heat. The thus-generated heat elevates an internal temperature of the battery within a short period of time to thereby rapidly and uniformly block pores of a separator, thus resulting in suppression of the overcharge reaction. However, as described above, oxidative decomposition of CHB leads to problems associated with the evolution of an excess of gas and thereby swelling of the battery, thus resulting in deterioration of the battery performance such as high-temperature storage properties, cycling properties, rate properties, and the like.

Meanwhile, use of 2-FBP can inhibit degradation of the battery properties occurring under high-temperature storage, by control of an electrolysis voltage of biphenyl due to electron withdrawing effect as well as steric effects of fluorine atoms in 2-FBP. Further, unlike CHB, 2-FBP exhibits no electrochemical polymerization which may bring about an increase in internal resistance of the battery and operates by a reaction mechanism that shuts down a separator simply by means of an exothermic reaction, thereby improving the high-temperature safety of the battery. In addition, 2-FBP undergoes an oxidation reaction at a higher electric potential than CHB, which thereby improves safety of the battery to prevent deterioration of the battery performance which may occur under high voltage/high current conditions. However, use of 2-FBP suffers from a shortcoming associated with relatively poor overcharge-prevention properties under high voltage/high current conditions, because 2-FBP does not inhibit dissociation of $O_2$ per se which may occur due to changes in the crystal structure, arising from excessive deintercalation of lithium ions from the cathode by overcharge of the battery.

On the other hand, the present invention features the combined use of CHB and 2-FBP in a given content range, which provides excellent overcharge-prevention properties under high voltage/high current conditions, while not causing deterioration of the battery performance. That is, an oxidation potential of CHB increases due to the interaction of CHB and 2-FBP whereas an oxidative decomposition potential of 2-FBP relatively decreases in conjunction with a continuous progress of the overcharge oxidative reaction. As a result, the overcharge-prevention action of the combined additive of CHB and 2-FBP in accordance with the present invention is very significantly improved.

According to the experiments performed by the present inventors, it was confirmed that combined addition of CHB and 2-FBP exhibits overcharge safety and high-temperature storage properties through very complicated interaction therebetween, rather than effects expected upon addition of individual components are exerted. That is, even though an increasing amount of added 2-FBP was expected to further improve prevention effects on deterioration of the battery performance such as high-temperature storage properties, it was confirmed that the battery performance is deteriorated if a content of 2-FBP is out of a given range. Further, it was also confirmed that the combined action of CHB and 2-FBP brings about unexpected results in high-temperature safety such as swelling properties. Therefore, it is possible to achieve desired prevention effects on deterioration of the battery performance such as overcharge safety and high-temperature storage properties, only when CHB and 2-FBP are added in a given content range in accordance with the present invention to the electrolyte.

Specifically, within the specific content range according to the present invention, a small amount of CHB, undergoing an oxidation reaction first, operates to form a film on a cathode to thereby inhibit dissociation of $O_2$ which occurs due to changes in the crystal structure, arising from excessive deintercalation of lithium ions from the cathode by overcharge of the battery. Thereafter, 2-FBP operates at the corresponding voltage and shuts down the separator by means of an exothermic reaction to prevent thermal runway, which achieves synergistic effects associated with the battery safety under high voltage/high current conditions.

In the present invention, the content of CHB, as defined hereinbefore, is in a range of 3 to 5% by weight, based on the total weight of the electrolyte. If the content of CHB is lower than 3% by weight, overcharge-prevention effects are insignificant. On the other hand, if the content of CHB is higher than 5% by weight, an exothermic oxidation reaction leads to decomposition of CHB in conjunction with evolution of a large quantity of gas and thereby significant swelling of the battery, and also results in formation of a film on the cathode in conjunction with increased internal resistance of the battery, thus causing deterioration of the battery performance. That is, where the content of CHB is out of the above-specified range, e.g. lower than 3% by weight or higher than 5% by weight, this may result in significant deterioration of the battery performance. More preferably, the content of CHB is in a range of 3.5 to 5% by weight.

In the present invention, the content of 2-FBP, as defined hereinbefore, is in a range of 0.2 to 1.5% by weight, based on the total weight of the electrolyte. If the content of 2-FBP is lower than 0.2% by weight, it is difficult to achieve desired supplementation of overcharge-prevention properties and prevention effects on deterioration of the battery performance such as high-temperature storage properties. On the other hand, if the content of 2-FBP is higher than 1.5% by weight, this may result in degradation of the high-temperature storage properties and relative delay of the overcharge-prevention action, which undesirably leads to a relative decrease of the electrolyte, thereby deteriorating rate properties. More preferably, the content of 2-FBP is in a range of 0.5 to 1.5% by weight.

These facts can be more clearly confirmed from Examples and Experimental Examples which will be illustrated hereinafter.

Meanwhile, even though the content of 2-FBP in the electrolyte of the present invention is lower than that of CHB, in terms of improved overcharge-prevention properties in conjunction with maximum inhibition of deterioration of the battery performance, it was confirmed that overcharge-prevention properties under high voltage/high current conditions are significantly improved even with addition of a small amount of 2-FBP. It can be said that such a fact is a very innovative discovery, upon considering that it is possible to achieve an original purpose while substantially preventing a fundamental problem occurred upon addition of other material to the electrolyte so as to achieve a desired purpose, e.g. deterioration of the battery performance.

On the other hand, when a difference between the content of CHB and the content of 2-FBP is in a range of 2 to 4% by weight, it is possible to achieve excellent overcharge-prevention properties and high-temperature storage performance.

As the secondary battery electrolyte, a lithium-containing non-aqueous electrolyte may be preferably used. The lithium-containing non-aqueous electrolyte is composed of a non-aqueous electrolyte and a lithium salt.

For example, the non-aqueous electrolyte that can be used in the present invention may be at least one selected from the group consisting of N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and any combination thereof.

Preferably, the electrolyte may be composed of a combination of a cyclic carbonate and a linear carbonate.

The lithium salt is a material that is readily soluble in the above-mentioned non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imide.

Where appropriate, an organic solid electrolyte or an inorganic solid electrolyte may be utilized as the non-aqueous electrolyte.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

In accordance with another aspect of the present invention, there is provided a lithium secondary battery comprising an electrolyte with addition of CHB and 2-FBP in a given content range. Generally, the lithium secondary battery is comprised of an electrode assembly including a cathode, an anode and a separator disposed therebetween, in conjunction with a lithium-containing non-aqueous electrolyte.

The cathode is, for example, fabricated by applying a mixture of a cathode active material, a conductive material and a binder to a cathode current collector, followed by drying and pressing. If necessary, a filler may be further added to the above mixture.

Examples of the cathode active material may include, but are not limited to, layered compounds such as lithium cobalt oxide (LiCoO$_2$) and lithium nickel oxide (LiNiO$_2$), or compounds substituted with one or more transition metals; lithium manganese oxides such as compounds of Formula Li$_{1+x}$Mn$_{2-x}$O$_4$ ($0 \leq x \leq 0.33$), LiMnO$_3$, LiMn$_2$O$_3$ and LiMnO$_2$; lithium copper oxide (Li$_2$CuO$_2$); vanadium oxides such as LiV$_3$O$_8$, V$_2$O$_5$ and Cu$_2$V$_2$O$_7$; Ni-site type lithiated nickel oxides of Formula LiNi$_{1-x}$M$_x$O$_2$ (M=Co, Mn, Al, Cu, Fe, Mg, B or Ga, and $0.01 \leq x \leq 0.3$); lithium manganese composite oxides of Formula LiMn$_{2-x}$M$_x$O$_2$ (M=Co, Ni, Fe, Cr, Zn or Ta, and $0.01 \leq x \leq 0.1$), or Formula Li$_2$Mn$_3$MO$_8$ (M=Fe, Co, Ni, Cu or Zn); LiMn$_2$O$_4$ wherein a portion of Li is substituted with alkaline earth metal ions; disulfide compounds; Fe$_2$(MoO$_4$)$_3$; LiFe$_3$O$_4$, etc. More preferred are LiCoO$_2$, LiMn$_2$O$_4$, LiNiO$_2$, and lithium nickel-manganese-cobalt composite oxides such as LiNi$_{1/13}$Mn$_{1/3}$Co$_{1/3}$O$_2$.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding of the electrode active material with the conductive material, and in binding of the electrode active material with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying an anode material to an anode current collector, followed by drying. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material.

In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

EXAMPLES

Now, the present invention will be described in more detail with reference to the following Examples. These examples are provided only for illustrating the present invention and should not be construed as limiting the scope and spirit of the present invention.

1-1. Preparation of Electrolyte

1M $LiPF_6$ was added to an organic solvent mixture of ethylene carbonate (EC) as cyclic carbonate/ethylmethyl carbonate (EMC) as linear carbonate (1:2, w/w). To the resulting mixture were added 0.5% by weight of 2-fluoro biphenyl (2-FBP) and 3.5% by weight of cyclohexyl benzene (CHB), based on the total weight of an electrolyte, thereby preparing an electrolyte.

1-2. Fabrication of Lithium Secondary Battery

95% by weight of $LiCoO_2$ as a cathode active material, 2.5% by weight of Super-P as a conductive material and 2.5% by weight of PVdF as a binder were added to N-methyl-2-pyrrolidone (NMP) as a solvent to thereby prepare a cathode mixture slurry. Thereafter, the resulting cathode slurry was coated on one side of aluminum foil, followed by drying and pressing to thereby fabricate a cathode.

95% by weight of artificial graphite as an anode active material, 2.5% by weight of Super-P as a conductive material and 2.5% by weight of PVdF as a binder were added to NMP to thereby prepare an anode mixture slurry. Thereafter, the resulting anode slurry was coated on one side of copper foil, followed by drying and pressing to thereby fabricate an anode.

The cathode and the anode were sequentially stacked with disposition of a Celgard™ separator therebetween. Then, the electrolyte prepared in Section 1-1 was injected into the resulting electrode assembly to thereby fabricate a lithium secondary battery having a capacity of 890 mA.

Example 2

A lithium secondary battery was fabricated in the same manner as in Example 1, except that 1.5% by weight of 2-FBP and 3.5% by weight of CHB were added to an electrolyte.

Example 3

A lithium secondary battery was fabricated in the same manner as in Example 1, except that 0.5% by weight of 2-FBP and 5% by weight of CHB were added to an electrolyte.

Example 4

A lithium secondary battery was fabricated in the same manner as in Example 1, except that 3% by weight of CHB and 0.2% by weight of 2-FBP were added to an electrolyte.

Example 5

A lithium secondary battery was fabricated in the same manner as in Example 1, except that 5% by weight of CHB and 1.5% by weight of 2-FBP were added to an electrolyte.

Example 6

A lithium secondary battery having a capacity of 1300 mA was fabricated based on the method of Example 1.

Comparative Example 1

A lithium secondary battery was fabricated in the same manner as in Example 1, except that 3.5% by weight of CHB was added to an electrolyte without addition of 2-FBP.

Comparative Example 2

A lithium secondary battery was fabricated in the same manner as in Example 1, except that 0.5% by weight of 2-FBP was added to an electrolyte without addition of CHB.

Comparative Example 3

A lithium secondary battery was fabricated in the same manner as in Example 1, except that 0.5% by weight of biphenyl (BP) instead of 2-FBP was added to an electrolyte.

Comparative Example 4

A lithium secondary battery was fabricated in the same manner as in Example 1, except that 0.5% by weight of BP instead of 2-FBP was added to an electrolyte without addition of CHB.

Comparative Example 5

A lithium secondary battery was fabricated in the same manner as in Example 1, except that both of 2-FBP and CHB were not added to an electrolyte.

Comparative Example 6

A lithium secondary battery was fabricated in the same manner as in Example 1, except that 2% by weight of 2-FBP and 3.5% by weight of CHB were added to an electrolyte.

Comparative Example 7

A lithium secondary battery was fabricated in the same manner as in Example 1, except that 0.1% by weight of 2-FBP and 3.5% by weight of CHB were added to an electrolyte.

Comparative Example 8

A lithium secondary battery was fabricated in the same manner as in Example 1, except that 0.5% by weight of 2-FBP and 2% by weight of CHB were added to an electrolyte.

Comparative Example 9

A lithium secondary battery was fabricated in the same manner as in Example 1, except that 0.5% by weight of 2-FBP and 6% by weight of CHB were added to an electrolyte.

Comparative Example 10

A lithium secondary battery having a capacity of 1300 mA was fabricated in the same manner as in Comparative Example 3.

Comparative Example 11

A lithium secondary battery was fabricated in the same manner as in Example 1, except that 1.5% by weight of CHB and 1.5% by weight of 2-FBP were added to an electrolyte.

Comparative Example 12

A lithium secondary battery was fabricated in the same manner as in Example 1, except that 2% by weight of CHB and 1% by weight of 2-FBP were added to an electrolyte.

Comparative Example 13

A lithium secondary battery was fabricated in the same manner as in Example 1, except that 0.5% by weight of CHB and 3% by weight of 2-FBP were added to an electrolyte.

Experimental Example 1

In order to evaluate high-temperature storage characteristics, batteries prepared in Examples 1 to 5 and Comparative Examples 1 to 13 were respectively subjected to full charging, followed by storage at 60° C. for 3 days, and the battery capacity was then measured. A ratio (recovery %) of a residual capacity relative to an initial capacity and changes in the thickness of batteries are shown in Table 1 below.

As can be seen from the results of Table 1, batteries of Examples 1 to 5 exhibited an excellent capacity recovery rate of more than 93% after high-temperature storage, and a thickness increase of less than 150 μm, thus representing that swelling of the battery was prevented. These results satisfy the battery property specifications which are generally required.

On the other hand, the battery of Comparative Example 3 with combined addition of CHB and BP exhibited a significant decrease of 80% in the capacity recovery rate and a very significant thickness increase of 260 μm, due to the addition of BP Further, the battery of Comparative Example 9 with addition of 6% by weight of CHB exhibited a low capacity recovery rate of 88% and a very significant thickness increase of 400 μm, due to an excessively high content of CHB. Such a swelling phenomenon was due to the evolution of a large amount of gas, resulting from the oxidative decomposition of CHB. That is, when an amount of added CHB was higher than 5% by weight (Comparative Example 9), the formation of a film on the cathode results in increased internal resistance of the battery, thereby decreasing the high-temperature storage capacity, and swelling of the battery was severe due to the evolution of a large amount of gas, resulting from the oxidative decomposition of CHB.

Further, it was confirmed that the battery of Comparative Example 6 with addition of 2% by weight of 2-FBP exhibited a significantly low capacity recovery rate and a large thickness increase. Such deterioration of the battery performance is due to a relative decrease in an amount of the electrolyte, which results from relative delay of the overcharge-prevention action when an amount of added 2-FBP exceeds 1.5% by weight (Comparative Example 6).

Experimental Example 2

In order to evaluate overcharge-prevention properties, 10 batteries prepared in Examples 1 to 5 and 8 to 10 batteries prepared in Comparative Examples 1 to 13 were respectively subjected to a charge test under charge conditions of 10 V and 1 A. The results thus obtained are given in Table 1 and FIGS. 1 to 5. For the charge test, batteries charged to 4.2 V were overcharged up to 10 V at a constant current of 1 A, and then maintained at a constant voltage of 10 V for 6 hours. Upon no ignition and explosion of the batteries during the overcharge test, the batteries were regarded as passing the safety test for overcharge of the battery.

TABLE 1

|  | CHB (wt %) | 2-FBP (wt %) | BP (wt %) | Overcharge | Recovery (%) | Changes in thickness |
|---|---|---|---|---|---|---|
| Ex. 1 | 3.5 | 0.5 | — | Pass (0/10) | 96% | 100 μm |
| Ex. 2 | 3.5 | 1.5 | — | Pass (0/10) | 96% | 80 μm |
| Ex. 3 | 5 | 0.5 | — | Pass (0/10) | 93% | 150 μm |
| Ex. 4 | 3 | 0.2 | — | Pass (0/10) | 96% | 70 μm |
| Ex. 5 | 5 | 1.5 | — | Pass (0/10) | 93% | 130 μm |
| Comp. Ex. 1 | 3.5 | — | — | Fail (3/10) | 96% | 170 μm |
| Comp. Ex. 2 | — | 0.5 | — | Fail (10/10) | 96% | 120 μm |
| Comp. Ex. 3 | 3.5 | — | 0.5 | Fail (2/8) | 80% | 260 μm |
| Comp. Ex. 4 | — | — | 0.5 | Fail (10/10) | 96% | 160 μm |
| Comp. Ex. 5 | — | — | — | Fail (10/10) | 97% | 120 μm |
| Comp. Ex. 6 | 3.5 | 2 | — | Pass (0/10) | 85% | 200 μm |
| Comp. Ex. 7 | 3.5 | 0.1 | — | Fail (4/8) | 95% | 150 μm |
| Comp. Ex. 8 | 2 | 0.5 | — | Fail (8/8) | 93% | 180 μm |
| Comp. Ex. 9 | 6 | 0.5 | — | Pass (0/10) | 88% | 400 μm |
| Comp. Ex. 11 | 1.5 | 1.5 | — | Fail (9/10) | 95% | 110 μm |
| Comp. Ex. 12 | 2 | 1 | — | Fail (6/10) | 94% | 130 μm |
| Comp. Ex. 13 | 0.5 | 3 | — | Fail (10/10) | 96% | 90 μm |

Figure 2:
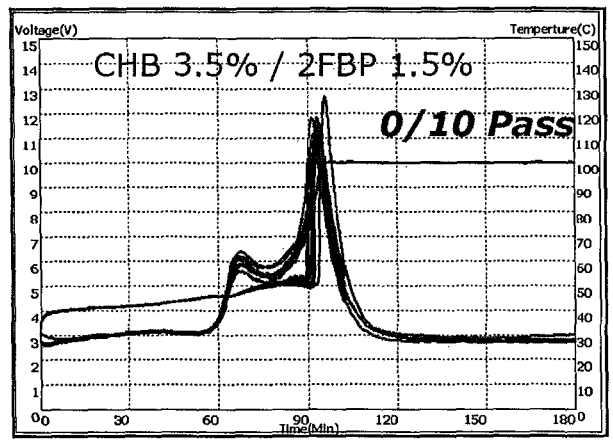
FIG. 2 is a graph showing overcharge profiles of batteries of Example 2.

As can be seen from the results of Table 1, it was confirmed that all of batteries of Examples 1 to 5 pass the overcharge safety requirements. FIGS. 1 and 2 show overcharge profiles of batteries of Examples 1 and 2. As shown in FIGS. 1 and 2, it can be seen that the batteries in accordance with the present invention are safe against the overcharge test.

On the other hand, it can be seen that all of the batteries of Comparative Example 2, 4 and 5 with no addition of CHB fail to pass the overcharge safety requirements. That is, it can be seen that the batteries with addition of BP or 2-FBP alone can exhibit substantially no overcharge safety. Further, when the content of CHB is lower than 3% by weight (see Comparative Examples 8, 11, 12 and 13), most of batteries fail to pass the overcharge safety requirements.

Meanwhile, only 7 batteries out of 10 batteries of Comparative Example 1 used in the experiment passed the overcharge safety requirements, whereas only 4 batteries out of 8 batteries of Comparative Example 7 passed the overcharge safety requirements. Therefore, it can be seen that it is impossible to secure reliable overcharge safety when CHB alone is added or a content of 2-FBP is lower than 0.2% by weight.

Figure 3:
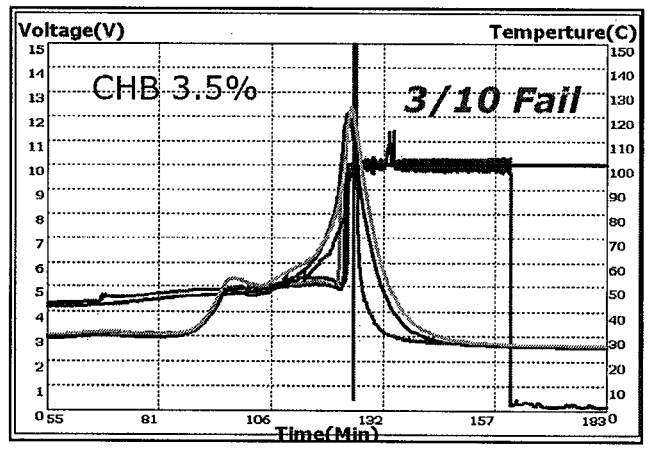
FIG. 3 is a graph showing overcharge profiles of batteries that passed the overcharge safety requirements in Experimental Example 2, among batteries of Comparative Example 1.
Figure 4:
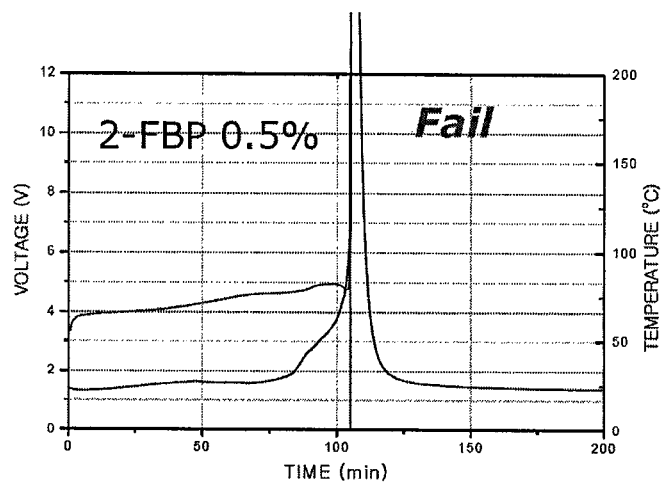
FIG. 4 is a graph showing overcharge profiles of batteries that failed to pass the overcharge safety requirements in Experimental Example 2, among batteries of Comparative Example 2.
Figure 5:
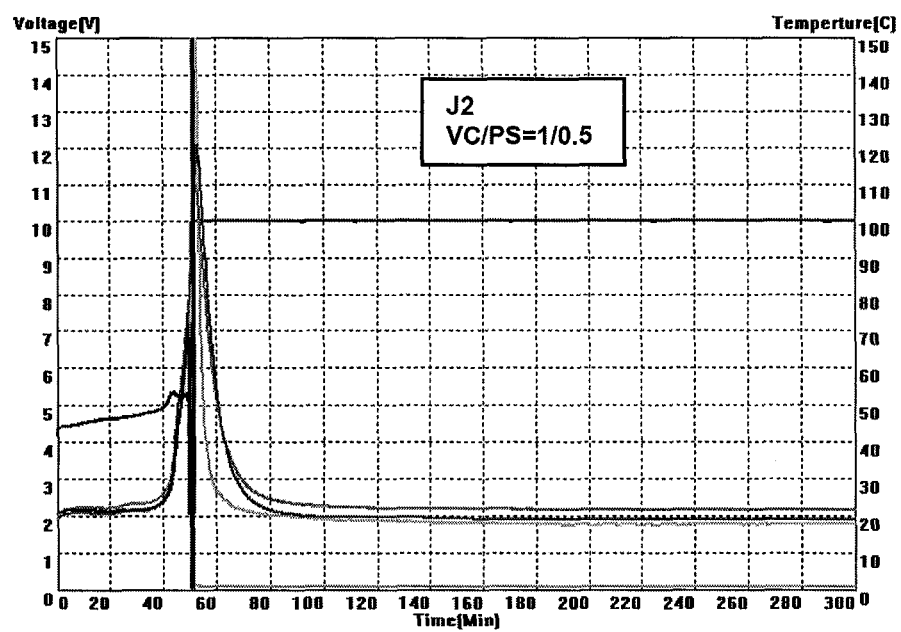
FIG. 5 is a graph showing overcharge profiles of batteries that failed to pass the overcharge safety requirements in Experimental Example 2, among batteries of Comparative Example 5.

FIGS. 3 to 5 show overcharge profiles of batteries of Comparative Examples 1, 2 and 5. More specifically, FIG. 3 is a graph showing overcharge profiles of the batteries of Comparative Example 1 that passed the overcharge safety requirements, and FIG. 4 is a graph showing overcharge profiles of the batteries of Comparative Example 2 that failed to pass the overcharge safety requirements. FIG. 5 is a graph showing overcharge profiles of the batteries of Comparative Example 5 that failed to pass the overcharge safety requirements.

As shown in FIGS. 3 to 5, the battery with addition of CHB alone (Comparative Example 1; see FIG. 3) exhibited a relatively low value in the exothermic peak, as compared to addition of CHB and 2-FBP (Examples 1 and 2), whereas the battery with no addition of CHB (Comparative Example 2; see FIG. 4) and the battery with no addition of an overcharge additive (Comparative Example 5; see FIG. 5) exhibited no exothermic peak which appears before reaching the curve, as shown upon addition of CHB.

Figure 6:
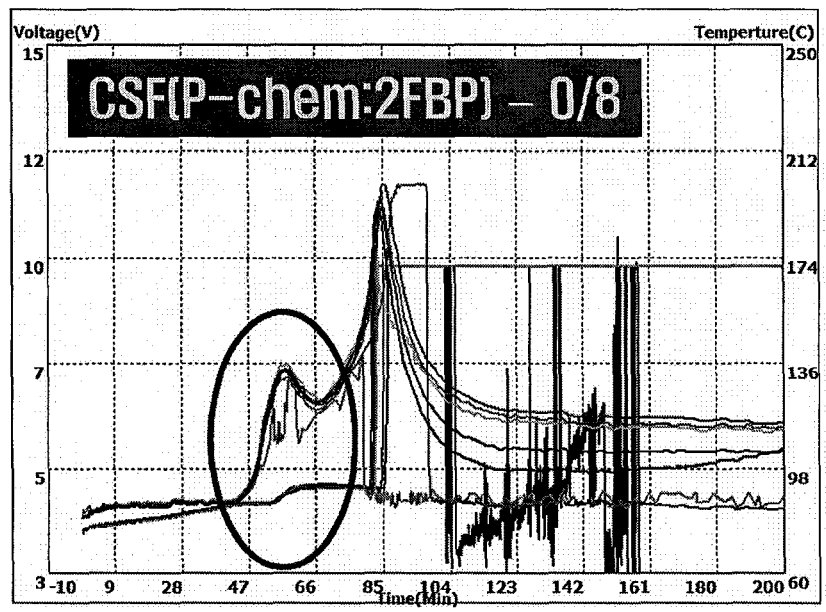
FIG. 6 is a graph showing overcharge profiles of batteries that passed the overcharge safety requirements in Experimental Example 2, among batteries of Example 6.
Figure 7:
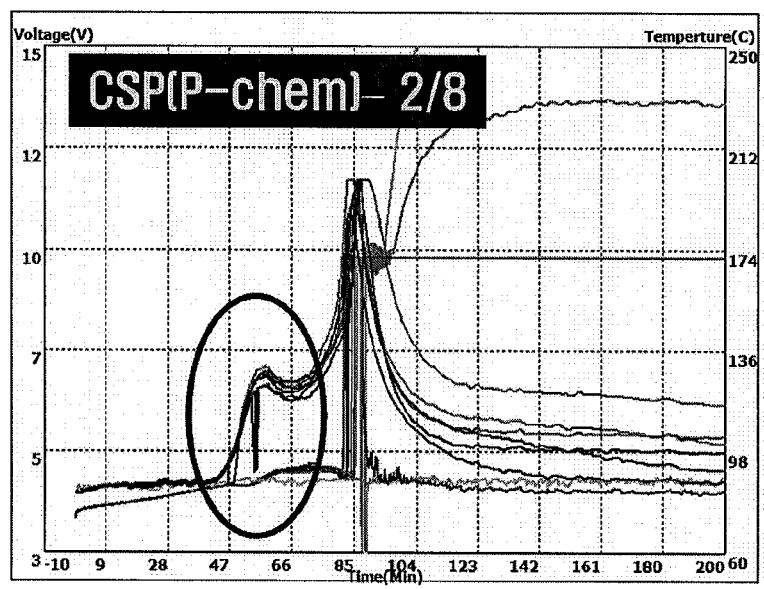
FIG. 7 is a graph showing overcharge profiles of batteries of Comparative Example 10.
Figure 8:
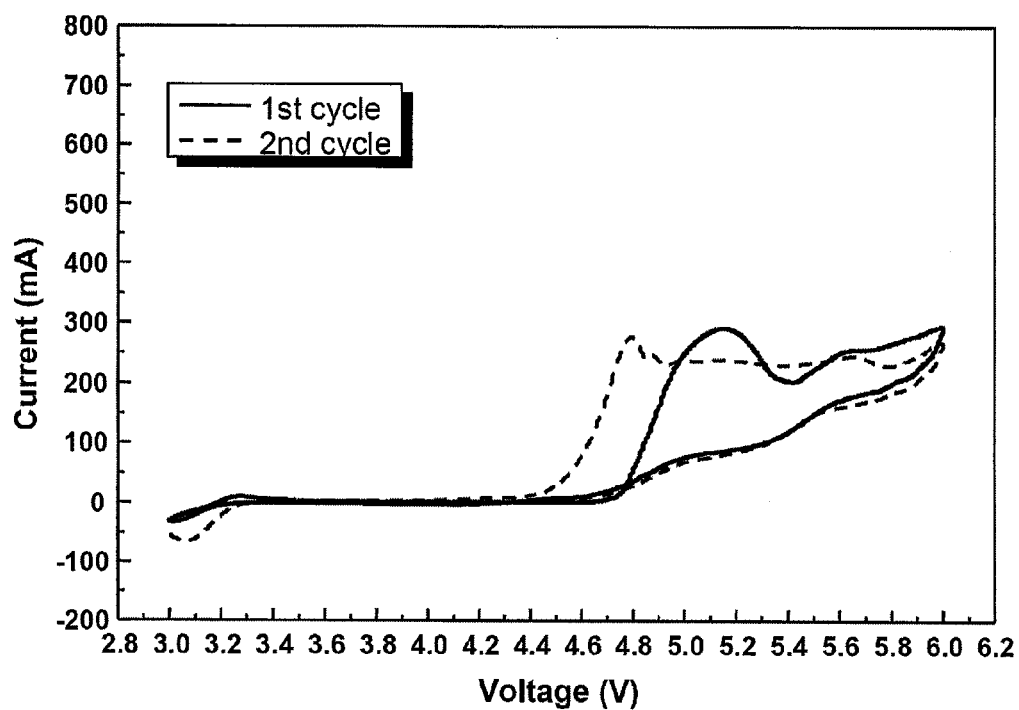
FIG. 8 is a graph for cyclic voltammetry experimental results according to Experimental Example 3, showing changes in the redox potential upon addition of 2-FBP and CHB to an electrolyte.
Figure 9:
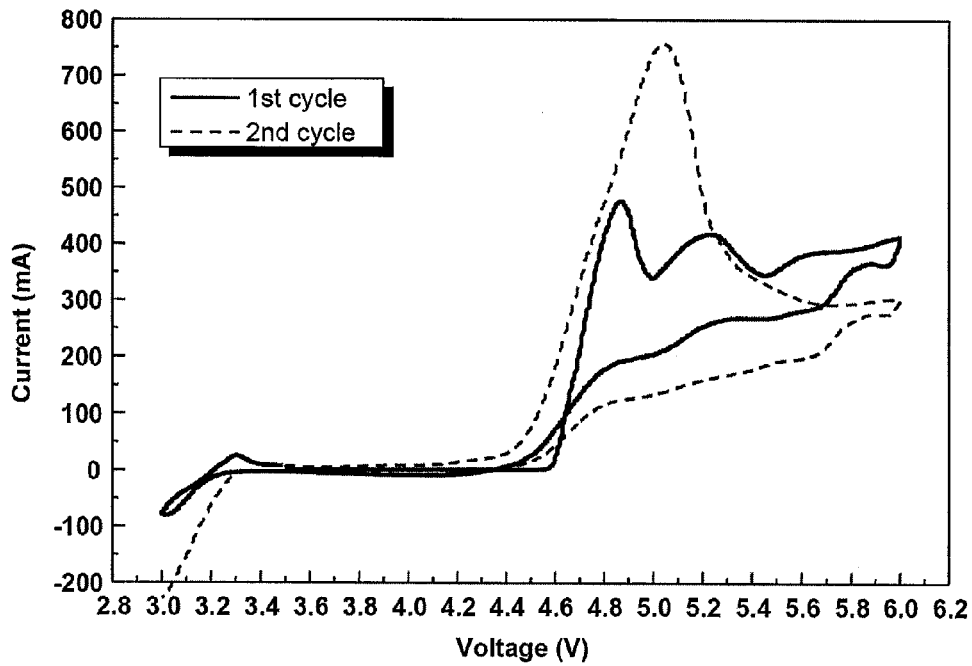
FIG. 9 is a graph for cyclic voltammetry experimental results according to Experimental Example 3, showing changes in the redox potential upon addition of BP and CHB to an electrolyte.
Figure 10:
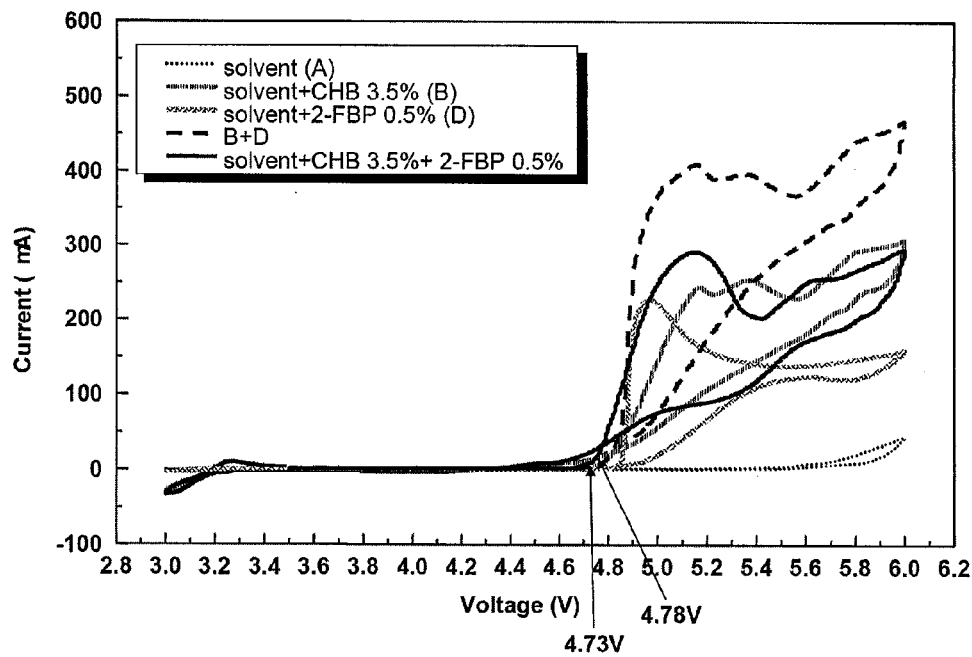
FIG. 10 is a graph for cyclic voltammetry experimental results according to Experimental Example 3, showing changes in the redox potential upon addition of 2-FBP or CHB alone to an electrolyte, no addition of both 2-FBP and CHB to an electrolyte, and addition of both 2-FBP and CHB to an electrolyte, respectively.
Figure 11:
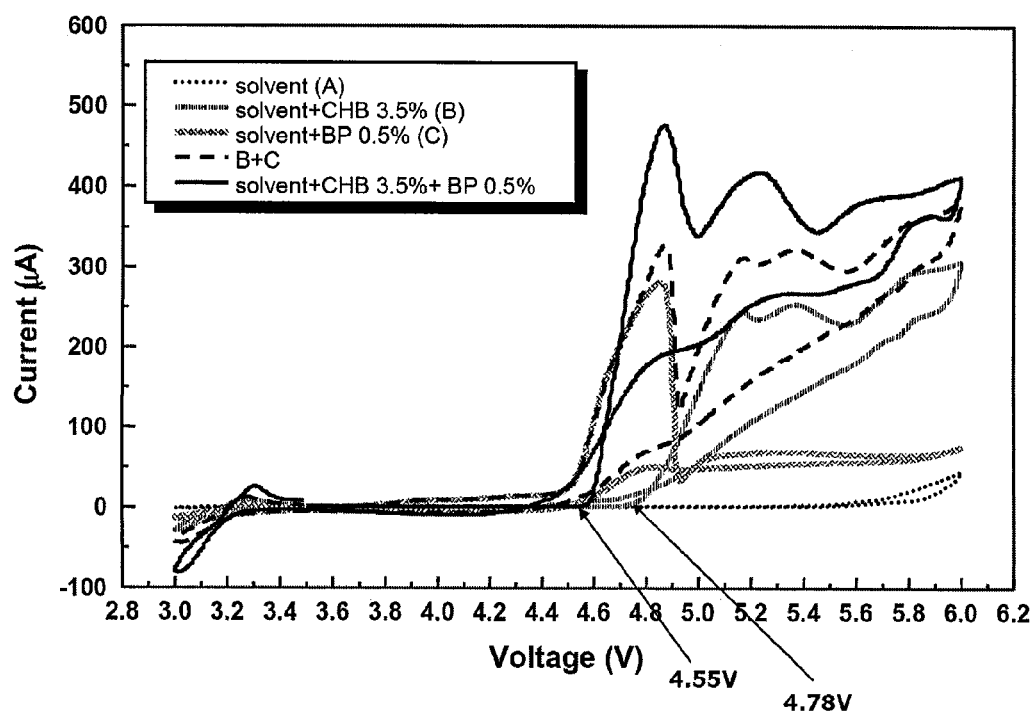
FIG. 11 is a graph for cyclic voltammetry experimental results according to Experimental Example 3, showing changes in the redox potential upon addition of BP or CHB alone to an electrolyte, no addition of both BP and CHB to an electrolyte, and addition of both BP and CHB to an electrolyte, respectively.

For clear comparison of overcharge-prevention properties between a CHB/2-FBP system and a CHB/BP system, FIG. 6 shows overcharge profiles of the battery of Example 6, and FIG. 7 shows overcharge profiles of the battery of Comparative Example 10.

As shown in FIGS. 6 and 7, the batteries of Example 6 employing the CHB/2-FBP system exhibited an exothermic peak at about 136° C. due to polymerization of CHB, thereby securing the overcharge safety of the battery.

On the other hand, the batteries employing the CHB/BP system (Comparative Example 10; see FIG. 7) exhibited a relatively low value in the exothermic energy, so it can be seen that sufficient overcharge-prevention properties are not exerted.

Experimental Example 3

In order to examine changes in the redox potential upon addition of 2-FBP and CHB in electrolytes which were prepared in Example 1 and Comparative Examples 1 to 5, a cyclic voltammetry experiment was carried out. The results thus obtained are given in Table 2 and FIGS. 8 to 11.

TABLE 2

|  | 1 cycle | 2 cycles |
|---|---|---|
| Ex. 1 | 4.73 V | 4.47 V |
| Comp. Ex. 1 | 4.78 V | 4.47 V |

TABLE 2-continued

|  | 1 cycle | 2 cycles |
|---|---|---|
| Comp. Ex. 2 | 4.82 V | 4.59 V |
| Comp. Ex. 3 | 4.55 V | 4.37 V |
| Comp. Ex. 4 | 4.42 V | 4.56 V |
| Comp. Ex. 5 | 5.21 V | 5.29 V |

As shown in Table 2 and FIGS. 8 to 11, addition of CHB and 2-FBP (Example 1; see FIG. 8) exhibited substantially no shift of an oxidation potential with from 4.78 V to 4.73 V at 1 cycle and from 4.47 V to 4.47 V at 2 cycles, upon comparison with addition of CHB alone (Comparative Example 1), whereas addition of BP and CHB (Comparative Example 3; see FIG. 9) exhibited a significant shift of an oxidation potential with from 4.78 V to 4.55 V at 1 cycle and from 4.47 V to 4.37 V at 2 cycles, thus representing significant deterioration of rate properties.

Through the above-mentioned results, it can be seen that addition of CHB and 2-FBP in accordance with the present invention results in a relatively significant decrease in deterioration of rate properties due to a controlled electrolysis voltage, as compared to addition of CHB and BP.

Further, addition of CHB and 2-FBP (Example 1; see FIG. 10) exhibited a decrease in an oxidation current value, as compared to the sum of each addition of BP and CHB, and showed an oxidation potential almost comparable to a level of the oxidation potential obtained upon addition of CHB alone (Comparative Example 1). However, addition of BP and CHB (Comparative Example 3; see FIG. 11) exhibited a significant increase in the oxidation current value, as compared to the sum of each addition of BP and CHB, and showed an earlier onset of the reaction as compared to addition of CHB alone (Comparative Example 1).

INDUSTRIAL APPLICABILITY

As apparent from the above description, the present invention enables production of a secondary battery electrolyte having improved high temperature properties and improved overcharge-prevention properties under high voltage/high current conditions, in conjunction with minimized deterioration of the battery performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising an electrolyte, comprising cyclohexyl benzene and 2-fluoro biphenyl, wherein 3.5 to 5% by weight of cyclohexyl benzene and 0.5 to 1.5% by weight of 2-fluoro biphenyl are co-added to the electrolyte, wherein a difference between the content of cyclohexyl benzene and the content of 2-fluoro biphenyl is in the range of 2 to 4% by weight, and wherein a lithium salt is added to the electrolyte.

2. The secondary battery according to claim 1, wherein the electrolyte is a carbonate-based compound.

3. The secondary battery according to claim 2, wherein the electrolyte is a mixture of a linear carbonate compound and a cyclic carbonate compound.

* * * * *